US012809571B2

(12) United States Patent
Arora et al.

(10) Patent No.: US 12,809,571 B2
(45) Date of Patent: Nov. 24, 2026

(54) SYSTEMS AND METHODS FOR MANAGING SOUND SYSTEMS FOR DATA PROCESSING SYSTEMS USING OUT-OF-BAND METHODS

(71) Applicant: Dell Products L.P., Round Rock, TX (US)

(72) Inventors: Mohit Arora, Frisco, TX (US); Abeye Teshome, Austin, TX (US); Richard M. Tonry, Georgetown, TX (US); Bassem El-Azzami, Austin, TX (US); Vindokumar Vasudev Ottar, Mckinney, TX (US); Luis Antonio Valencia Reyes, Waxahachie, TX (US); Adolfo Sandor Montero, Pflugerville, TX (US); Rajaravi Chandra Kollarapu, Allen, TX (US)

(73) Assignee: Dell Products L.P., Round Rock, TX (US)

( * ) Notice: Subject to any disclaimer, the term of this patent is extended or adjusted under 35 U.S.C. 154(b) by 242 days.

(21) Appl. No.: 18/649,169

(22) Filed: Apr. 29, 2024

(65) Prior Publication Data

US 2025/0335147 A1 Oct. 30, 2025

(51) Int. Cl.
*G06F 3/16* (2006.01)

(52) U.S. Cl.
CPC .................................... *G06F 3/162* (2013.01)

(58) Field of Classification Search
CPC ....................................................... G06F 3/162
See application file for complete search history.

(56) References Cited

U.S. PATENT DOCUMENTS

| | | | | |
|---|---|---|---|---|
| 8,042,182 | B2 | 10/2011 | Milani Comparetti et al. | |
| 8,615,785 | B2 | 12/2013 | Elrod et al. | |
| 8,924,620 | B2 | 12/2014 | Harriman et al. | |
| 9,215,244 | B2 | 12/2015 | Ayyagari et al. | |
| 9,734,169 | B2 | 8/2017 | Redlich et al. | |
| 9,930,051 | B1 * | 3/2018 | Potlapally | H04L 63/126 |
| 10,176,308 | B2 | 1/2019 | Mintz et al. | |
| 10,298,670 | B2 | 5/2019 | Ben-Shael et al. | |
| 10,671,765 | B2 | 6/2020 | Swierk et al. | |
| 11,036,902 | B2 | 6/2021 | Nicholas | |
| 11,050,570 | B1 * | 6/2021 | Totah | H04L 9/3215 |
| 11,102,122 | B2 | 8/2021 | Seed et al. | |
| 11,134,380 | B2 | 9/2021 | Fox et al. | |
| 11,487,274 | B2 | 11/2022 | Valder et al. | |
| 11,681,987 | B1 * | 6/2023 | Smith | G06Q 10/1093 345/173 |
| 11,792,267 | B2 | 10/2023 | Kreiner et al. | |
| 12,068,958 | B1 * | 8/2024 | Henkel | H04L 41/5054 |
| 12,537,820 | B2 * | 1/2026 | Kollarapu | H04L 63/06 |

(Continued)

*Primary Examiner* — James R Sheleheda
(74) *Attorney, Agent, or Firm* — WOMBLE BOND DICKINSON (US) LLP

(57) ABSTRACT

Methods and systems for managing operation of data processing system are disclosed. To manage operation of the data processing system, a management controller of the data processing system may obtain and manage requests for initiating performance of auditory signals by the data processing system. The management controller may identify the sound information and parameters for performing the sound information by a sound system of the data processing system based on the requests. By doing so, the likelihood of providing audio-based services for a user of the data processing system may be increased.

20 Claims, 8 Drawing Sheets

(56) References Cited

U.S. PATENT DOCUMENTS

| | | | | |
|---|---|---|---|---|
| 12,537,829 | B2 * | 1/2026 | El-Azzami | G06F 16/903 |
| 12,542,786 | B2 * | 2/2026 | Montero | H04L 63/107 |
| 12,621,129 | B2 * | 5/2026 | Montero | H04L 9/0825 |
| 2009/0259848 | A1 * | 10/2009 | Williams | H04L 9/3228<br>713/168 |
| 2011/0087387 | A1 | 4/2011 | Safa-Bakhsh et al. | |
| 2016/0066189 | A1 * | 3/2016 | Mahaffey | H04W 12/12<br>455/405 |
| 2018/0039946 | A1 | 2/2018 | Bolte et al. | |
| 2018/0260342 | A1 * | 9/2018 | Thangaraj | G06F 11/3452 |
| 2019/0188368 | A1 * | 6/2019 | Hastings | H04L 63/0492 |
| 2021/0034048 | A1 | 2/2021 | Hajizadeh | |
| 2021/0073211 | A1 | 3/2021 | Wright, Sr. | |
| 2022/0038659 | A1 | 2/2022 | Michel | |
| 2022/0253044 | A1 * | 8/2022 | Tremblay | G05B 19/41865 |
| 2023/0027152 | A1 * | 1/2023 | Doshi | H04L 41/0661 |
| 2023/0204703 | A1 * | 6/2023 | Lagnado | G01S 1/68<br>342/385 |
| 2025/0337563 | A1 * | 10/2025 | Montero | H04L 9/0825 |

* cited by examiner

SYSTEMS AND METHODS FOR MANAGING SOUND SYSTEMS FOR DATA PROCESSING SYSTEMS USING OUT-OF-BAND METHODS

FIELD

Embodiments disclosed herein relate generally to managing a data processing system. More particularly, embodiments disclosed herein relate to systems and methods for managing operation of data processing systems including sound systems using a management controller of the data processing systems.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1A:
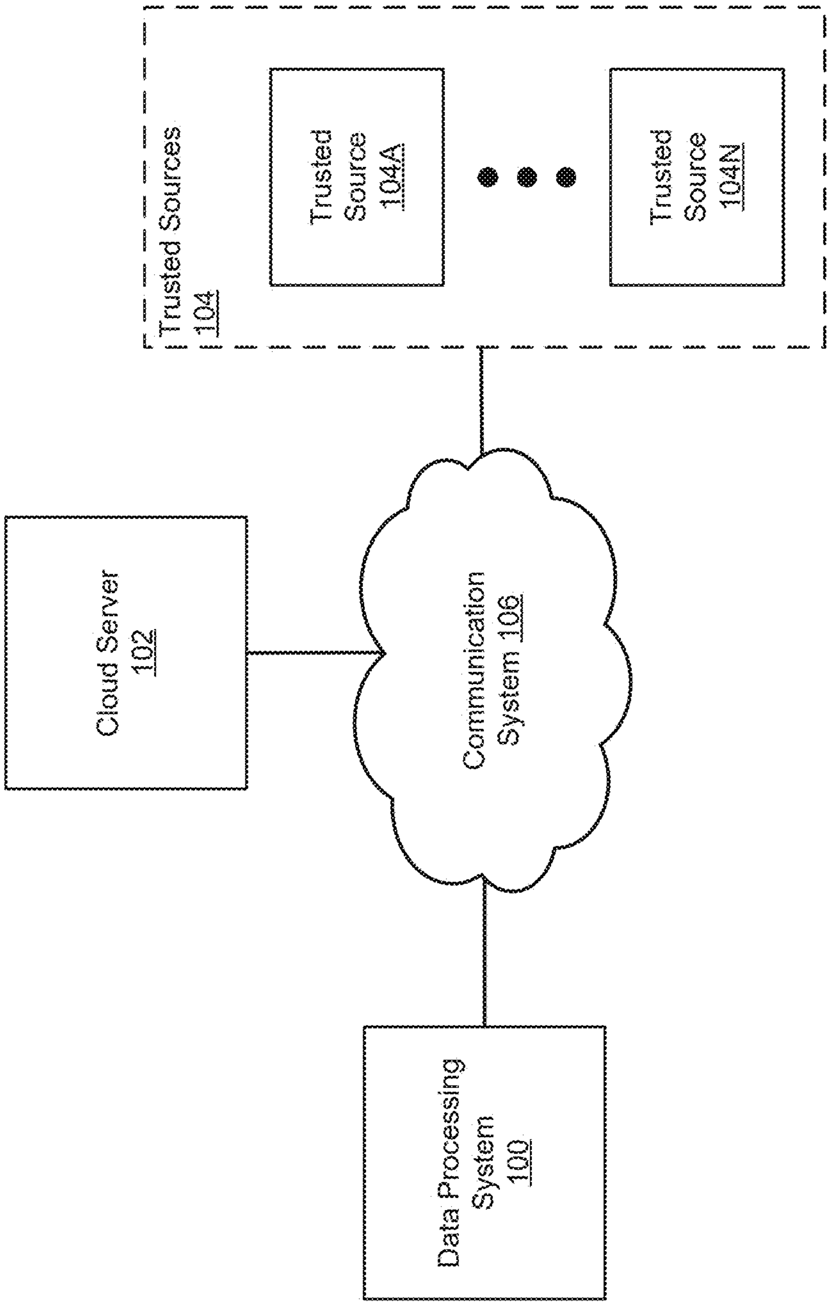
FIG. 1A shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing operations of a data processing system. The data processing system may provide computer-implemented services to any type and number of other devices and/or users of the data processing system. The computer-implemented services may include any quantity and type of such services. For example, the data processing system may provide audio-based services such as audio alerts, audio notifications, etc. for a user of the data processing system.

The data processing system may include in-band components (e.g., hardware resources) that may facilitate and/or perform the desired computer-implemented services, such as the audio-based services. For example, a sound system of the hardware resources may facilitate performance of a sound file in order to alert a user of the data processing system of an upcoming scheduled event.

However, compromise of one or more in-band components (e.g., the hardware resources) of the data processing system may negatively impact functionality of other in-band components. In addition, if the in-band components (e.g., the hardware resources) of the data processing system are depowered, the computer-implemented services may not be provided as desired by a user of the data processing system. For example, compromise and/or otherwise reduced functionality of in-band components may cause the data processing system to be unable to receive transmissions from remote entities attempting to provide instructions to the in-band components regarding performance of sounds to alert a user of the data processing system of conditions impacting the data processing system.

Consequently, compromise and/or otherwise reduced functionality of the in-band components of the data processing system may lead to a reduction in the quality and/or availability of the computer-implemented services to the user of the data processing system.

To manage operation of the data processing system in the event of compromise and/or reduced functionality of one or more in-band components of the data processing system, the data processing system may utilize out-of-band components (and/or out-of-band communication channels) to obtain and/or facilitate performance of auditory signals. The out-of-band components may function independently from the in-band components of the data processing system. Consequently, if in-band components and/or in-band communication channels are compromised or non-operational, then the audio-based services provided using the out-of-band methods may remain available and reliable.

By doing so, embodiments disclosed herein may provide a system for managing (operation of) a data processing system based on verified requests to initiate performance of sounds by the data processing system. To do so, the data processing system may include out-of-band components such as a management controller to manage the requests and initiate performance of sounds (e.g., as specified by the requests) in order to provide the desired computer-implemented services even during limited functionality or operation of in-band components of the data processing system. Thus, the computer-implemented services may be more likely to be provided as desired to a downstream consumer or user of the data processing system.

In an embodiment, a method for managing operation of a data processing system is provided. The method may include: obtaining, by a management controller of the data processing system and via an out-of-band channel, a request, the request specifying sound information for the data processing system; performing a verification process using the request to determine whether the request is from a trusted source; in an instance of performing the verification process where the request is determined to be from the trusted source: processing, by the management controller, a payload of the request to identify an action set to be performed; identifying, by the management controller, a sound system hosted by hardware resources of the data processing system to perform the action set; and providing, by the management controller and using a direct interface to the sound system, instructions to perform the action set in order to provide computer-implemented services by generating an auditory signal.

The action set may specify an identifier of a sound file and parameters in which the sound file is to be performed.

The management controller may cache a copy of the sound file in a sound file cache.

The sound file cache may include sound files that are used by remote entities to initiate performance of sounds to alert users of the data processing system to conditions impacting the data processing system.

The conditions impacting the data processing system may include at least one condition from a list of conditions consisting of: a location of the data processing system being unknown to the users of the data processing system; security of the data processing system being compromised; and safety of the users of the data processing system being compromised.

The direct interface may be a side band channel used to transmit data from the management controller to the sound system, the side band channel being a point to point link.

The direct interface may be a communication bus through which information is transmitted to at least one component comprising the sound system.

Processing the payload may include: identifying a message of the payload, the message specifying instructions to execute a sound file by the data processing system at a point in time; and using the instructions to identify the action set to be performed.

The action set may include: obtaining, by the management controller and using the out-of-band channel, first location data for the data processing system; obtaining, by the management controller and using the out-of-band channel, second location data for the trusted device; performing, by the management controller, a comparison process using the first location data and the second location data to determine whether a difference between the first location data and the second location data falls within a proximity threshold; in a first instance of the comparison process where it is determined that the difference between the first location data and the second location data falls within the proximity threshold: initiating performance of a sound alert by the identified sound system in order to allow a user to locate the data processing system.

The action set may also include: initiating performance of a sound alert by the identified sound system in order to notify a user of a scheduled event; wherein the sound alert is based on pre-configured settings corresponding to a user's calendar indicating upcoming events.

The action set may also include: initiating performance of a sound file by the identified sound system in order to allow a user to utilize the sound system of the data processing system; wherein the sound file is selected by the user using the trusted device and provided to the management controller via a remote cloud server and using the out-of-band channel.

The request may be provided to the management controller by a network module of the data processing system via the out-of-band communication channel.

The network module may be adapted to separately advertise network endpoints for the management controller and hardware resources of the data processing system, the network endpoints being usable by a server to address communications to the hardware resources using an in-band communication channel and the management controller using the out-of-band communication channel.

The management controller and the network module may be on separate power domains from the hardware resources so that the management controller and the network module are operable while the hardware resources are inoperable.

The out-of-band communication channel may run through the network module, and an in-band communication channel that services the hardware resources may also run through the network module.

The network module may host a transmission control protocol/internet protocol (TCP/IP) stack to facilitate network communications via the out-of-band communication channel.

In an embodiment, a non-transitory media is provided that may include instructions that when executed by a processor cause the computer-implemented method to be performed.

In an embodiment, a data processing system is provided that may include the non-transitory media and a processor, and may perform the computer-implemented method when the computer instructions are executed by the processor.

Turning to FIG. 1A, a block diagram illustrating a system in accordance with an embodiment is shown. The system shown in FIG. 1A may provide for management of data processing systems that may provide, at least in part, computer-implemented services. The system may include any number of data processing systems 100 (e.g., computing devices) that may each include any number of hardware components (e.g., processors, memory modules, storage devices, communications devices). The hardware components may support execution of any number and types of applications (e.g., software components). Changes in available functionalities of the hardware and/or software components may provide for various types of different computer-implemented services to be provided over time.

Operation of and/or computer-implemented services provided by a data processing system (e.g., data processing system 100) may be negatively impacted if in-band components (e.g., hardware components and/or software resources) have limited functionality and/or are not operational. For example, a user of data processing system 100 may be unable to physically locate the data processing system 100 and as such, the user may provide a request to generate an auditory signal to be performed by in-band components of the data processing system in order to locate the data processing system. However, the user may be unable to locate the data processing system using auditory signals if, for example, the operating system and/or the sound system is not operational (e.g., powered off) and unable to generate the auditory signals.

In general, embodiments disclosed herein may provide methods, systems, and/or devices for managing operation of a data processing system. The data processing system may include out-of-band components that may communicate with one another without traversing in-band communication channels and without utilizing in-band components. For example, the out-of-band components may manage auditory requests for the data processing system and provide sound information (e.g., specified by the auditory requests) to a sound system of the data processing system to initiate performance of sound file(s) included in the auditory requests. By doing so, potentially limited functioning or inoperable in-band components may be circumvented, increasing the likelihood of performing the auditory signals for a user of the data processing system in order to provide the desired computer-implemented services.

To perform the above-mentioned functionality, the system of FIG. 1A may include data processing system 100, cloud server 102, and/or trusted sources 104. Data processing system 100, cloud server 102, trusted sources 104, and/or any other type of devices not shown in FIG. 1A may perform all, or a portion of the computer-implemented services independently and/or cooperatively. Each of these components is discussed below.

Data processing system 100 may include any number and/or type of data processing systems and may provide computer-implemented services such as audio-based services. To do so, data processing system 100 may include out-of-band components (e.g., a network module, a management controller, etc.), and functionality that may allow data exchange between the out-of-band components independently from in-band components of data processing system 100. For more information regarding out-of-band components of data processing system 100, refer to the discussion of FIG. 1B.

For example, the out-of-band components of data processing system 100 may (i) manage requests (e.g., auditory requests) for data processing system 100, (ii) determine, based on the requests, whether the requesting entity is trustworthy (e.g., via identifying whether the requesting entity is one of the sources trusted by data processing system 100), (iii) perform actions (e.g., of an action set) based on the determination of whether the request is trustworthy that may update operation of data processing system 100 (e.g., via generating auditory signals specified by the requests) and/or (iv) perform other actions relating to facilitating data processing system 100 to provide the desired computer-implemented services.

Cloud server 102 may include any number and/or type of servers (e.g., other data processing systems, management systems, storage devices, user devices, etc.) that may provide computer-implemented services, such as audio-based services. To perform its functionality, cloud server 102 may communicate (e.g., exchange data) with the out-of-band components of data processing system 100 using out-of-band communication channels. For example, cloud server 102 may provide audio-based services for data processing system 100 via a management controller of data processing system 100 (e.g., bypassing any in-band components of data processing system 100).

Figure 2A:
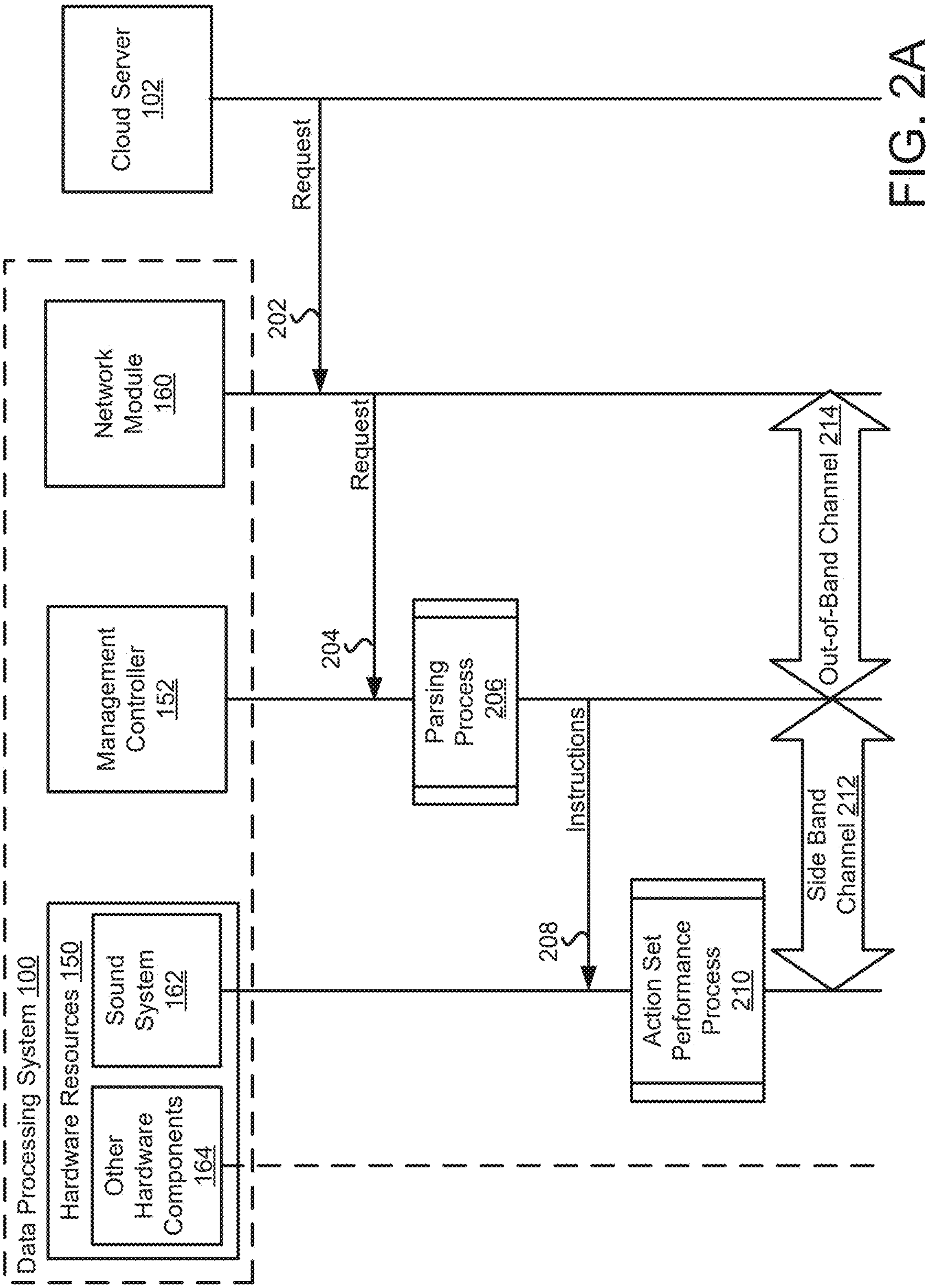
FIG. 2A shows an interaction diagram in accordance with an embodiment.

To provide audio-based services, cloud server 102 may, for example, (i) provide requests (e.g., for performance of sounds) to the management controller (e.g., via out-of-band communication channels), (ii) participate in authentication processes (e.g., in order to verify authenticity of requesting entities such as trusted sources 104), (iii) receive sound information (e.g., including sound files, identifiers of sound files, etc.) for data processing system 100 and/or (iv) perform other actions that may facilitate audio-based services to be provided by data processing system 100. Refer to FIG. 2A for additional information regarding managing requests for data processing systems in order to provide audio-based services.

Trusted sources 104 may also participate in the audio-based services. When participating in the audio-based services, trusted sources 104 may (i) provide requests for performance of sound files by data processing system 100, (ii) provide user input regarding authorization to provide requests for data processing system 100, and/or (iii) perform other actions that may facilitate audio-based services to be provided by data processing system 100.

Thus, the operation of data processing system 100 may be managed using out-of-band methods (e.g., using out-of-band components and via out-of-band communication channels). By doing so, performance of auditory signals to alert and/or otherwise notify a user of the data processing system may be provided even in the event that the in-band components (e.g., hardware components and/or software resources) have limited functionality, thereby increasing the likelihood of providing the desired computer-implemented services.

Figure 3:
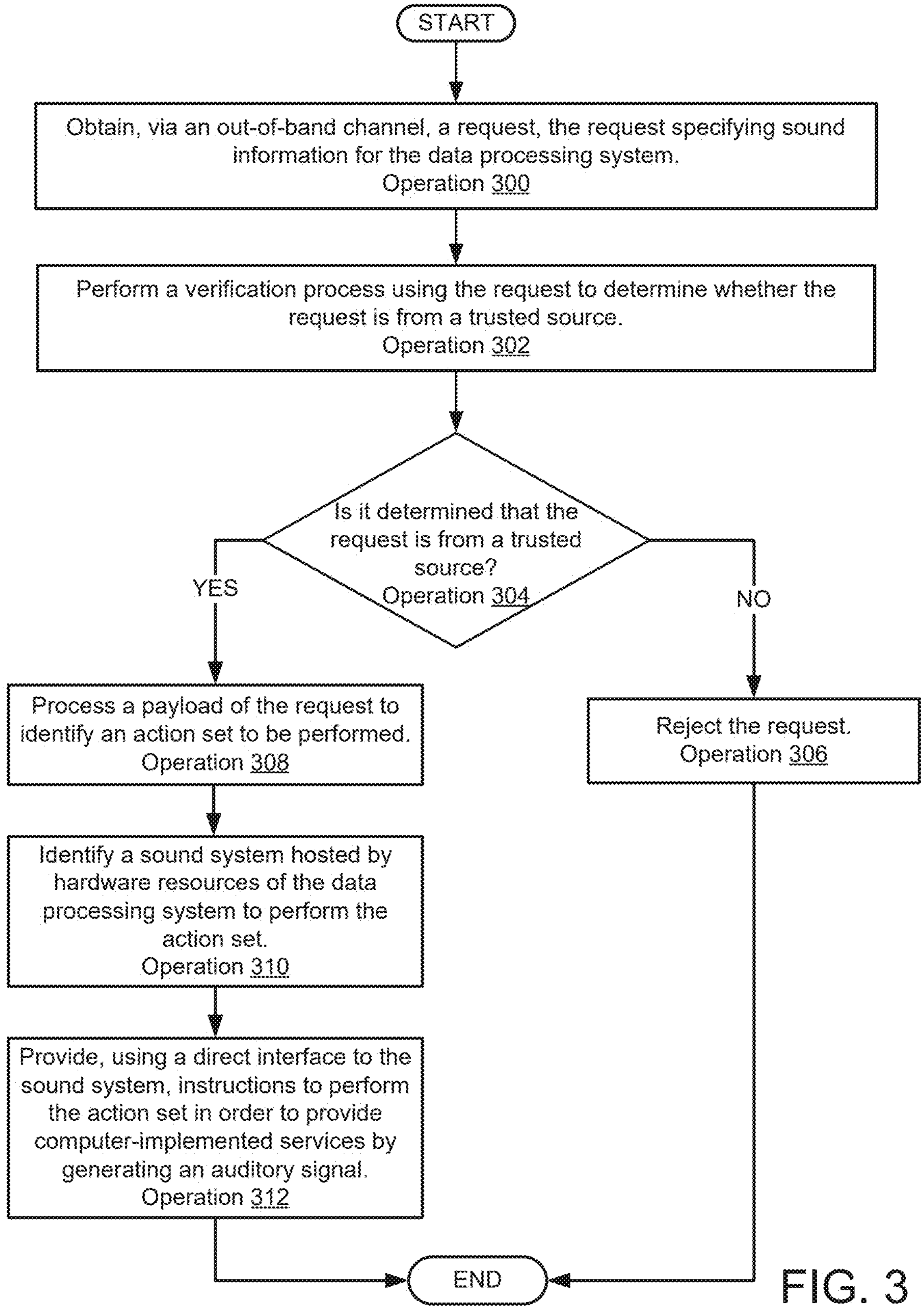
FIG. 3 shows a flow diagram illustrating a method of managing operation of a data processing system in accordance with an embodiment.

When providing their functionality, any of data processing system 100, cloud server 102, and/or trusted sources 104 may perform all, or a portion of the methods shown in FIG. 3.

Any of (and/or components thereof) data processing system 100, cloud server 102, and/or trusted sources 104 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., smartphone), an embedded system, local controllers, an edge node, and/or any other type of data processing device or system. For additional details regarding computing devices, refer to the discussion of FIG. 4.

In an embodiment, one or more of data processing system 100, cloud server 102, and/or trusted sources 104 are implemented using an internet of things (IoT) device, which may include a computing device. The IoT device may operate in accordance with a communication model and/or management model known to data processing system 100, cloud server 102, trusted sources 104, and/or other devices.

Any of the components illustrated in FIG. 1A may be operably connected to each other (and/or components not illustrated) with communication system 106. In an embodiment, communication system 106 includes one or more networks that facilitate communication between any number of components. The networks may include wired networks and/or wireless networks (e.g., and/or the Internet). The networks may operate in accordance with any number and/or types of communication protocols (e.g., such as the internet protocol). Communication system 106 may include any number of in-band communication channel and/or out-of-band communication channels.

While illustrated in FIG. 1A as including a limited number of specific components, a system in accordance with an embodiment may include fewer, additional, and/or different components than those illustrated therein. For example, while the system of FIG. 1A shows a single cloud server (e.g., 102), it will be appreciated that the system may include any number of cloud servers.

Figure 1B:
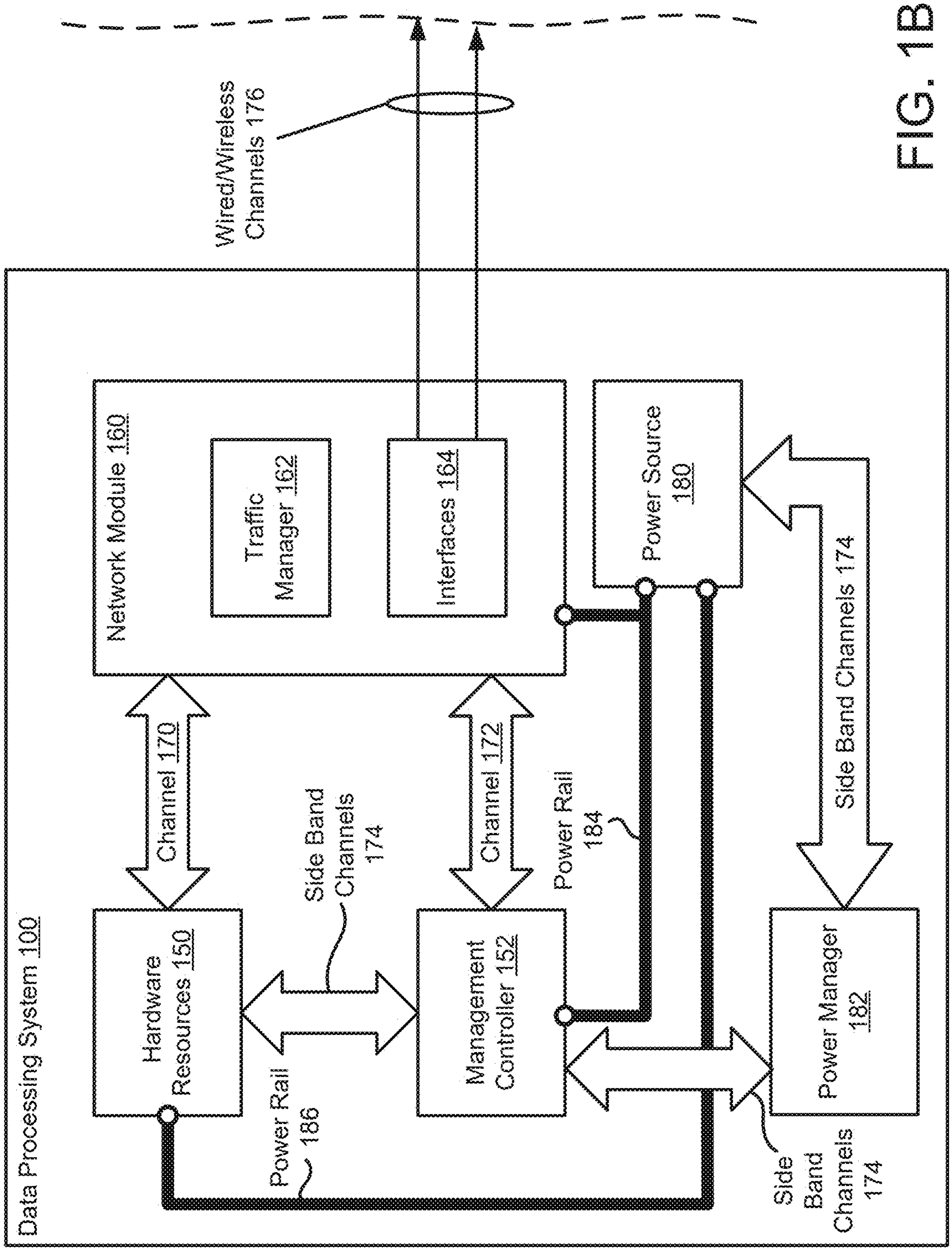
FIG. 1B shows a second block diagram illustrating a data processing system in accordance with an embodiment.

Turning to FIG. 1B, a diagram illustrating data processing system 100 in accordance with an embodiment is shown. Data processing system 100 may be similar to any of data processing systems 100 shown in FIG. 1A.

To provide computer-implemented services, data processing system 100 may include any quantity of hardware resources 150. Hardware resources 150 may be in-band hardware components, and may include a processor operably coupled to memory, storage, and/or other hardware components. Hardware resources 150 may (e.g., via the processor) provide the computer-implemented services desired by users of data processing system 100.

The processor may host various management entities such as operating systems, drivers, network stacks, and/or other software entities that provide various management functionalities. For example, the operating system and drivers may provide abstracted access to various hardware resources.

To facilitate communication, hardware resources 150 may host a network stack that may facilitate packaging, transmission, routing, and/or other functions with respect to exchanging data with other devices. For example, the network stack may support transmission control protocol/internet protocol communication (TCP/IP) (e.g., the Internet protocol suite) thereby allowing the hardware resources 150 to communicate with other devices via packet switched networks and/or other types of communication networks.

The processor may also host various applications that provide the computer-implemented services. The applications may utilize various services provided by the management entities and use (at least indirectly) the network stack to communicate with other entities.

However, use of the network stack and the services provided by the management entities may place the applications at risk of indirect compromise. For example, if any of these entities trusted by the applications are compromised, these entities may subsequently compromise the operation of the applications. Additionally, if various drivers and/or the communication stack are compromised, communications to/from other devices may be compromised. If the applications trust these communications, then the applications may also be compromised.

For example, to communicate with other entities, an application may generate and send communications to a network stack and/or driver, which may subsequently transmit a packaged form of the communication via channel 170 to a communication component, which may then send the packaged communication (in a yet further packaged form, in some embodiments, with various layers of encapsulation being added depending on the network environment outside of data processing system 100) to another device via any number of intermediate networks (e.g., via wired/wireless channels 176 that are part of the networks).

In addition, different configurations of hardware resources 150 and/or software resources may be implemented by data processing system 100 based on the type of computer-implemented services that are to be provided. Modifications to configurations of hardware resources 150 and/or the software resources may lead to downtime for data processing system 100 and may consume network bandwidth of channel 170.

To reduce the likelihood of the applications and/or other in-band entities from being indirectly compromised, data processing system 100 may include management controller 152 and network module 160. Each of these components of data processing system 100 is discussed below.

Management controller 152 may operate independently from hardware resources 150 and, therefore, hardware resources 150 may not host and/or manage operation of management controller 152. In addition, management controller 152 may be distinct from hardware resources 150 and, therefore, may be physically separate from hardware resources 150. Management controller 152 may also be operably connected to communication components of data processing system 100 via separate channels (e.g., 172) from the in-band components.

Management controller 152 may be implemented, for example, using a system on a chip or other type of independently operating computing device (e.g., independent from the in-band components, such as hardware resources 150, of a host data processing system 100). Management controller 152 may provide various management functionalities for data processing system 100. For example, management controller 152 may monitor various ongoing processes performed by the in-band component, may manage power distribution, thermal management, and/or other functions of data processing system 100.

To do so, management controller 152 may be operably connected to various components via side band channels 174 (in FIG. 1B, a limited number of side band channels are included for illustrative purposes, it will be appreciated that management controller 152 may communication with other components via any number of side band channels). The side band channels may be implemented using separate physical channels, and/or with a logical channel overlay over existing physical channels (e.g., logical division of in-band channels). The side band channels may allow management controller 152 to interface with other components and implement various management functionalities such as, for example, general data retrieval (e.g., to snoop ongoing processes), telemetry data retrieval (e.g., to identify a health condition/other state of another component), function activation (e.g., sending instructions that cause the receiving component to perform various actions such as displaying data, adding data to memory, causing various processes to be performed), and/or other types of management functionalities.

For example, to reduce the likelihood of indirect compromise of an application hosted by hardware resources 150, management controller 152 may enable information from other devices to be provided to the application without traversing the network stack and/or management entities of hardware resources 150. To do so, the other devices may direct communications including the information to management controller 152. Management controller 152 may then, for example, send the information via side band channels 174 to hardware resources 150 (e.g., to store it in a memory location accessible by the application, such as a shared memory location, a mailbox architecture, or other type of memory-based communication system) to provide it to the application. Thus, the application may receive and act on the information without the information passing through potentially compromised entities. Consequently, the information may be less likely to also be compromised, thereby reducing the possibility of the application becoming indirectly compromised. Similar processes may be used to facilitate outbound communications from the applications.

Information provided to the application by management controller 152 may include, for example, instructions for implementation of computer-implemented services desired by users of data processing system 100.

To facilitate communication with other devices, data processing system 100 may include network module 160. Network module 160 may provide communication services for in-band components and out-of-band components (e.g., management controller 152) of data processing system.

To provide the above-described functionalities, network module 160 may include traffic manager 162, interfaces 164, and may host an instance of a TCP/IP stack to facilitate communication with other devices independently of any of the in-band components (e.g., does not rely on any hosted software, hardware components, etc.). Accordingly, compromise of any of hardware resources 150 and hosted component may not result in indirect compromise of network module 160, management controller 152, and entities hosted by management controller 152.

Management controller 152 may be operably connected to communication components of data processing system 100 via separate channels (e.g., 172) from the in-band components, and may implement or otherwise utilize a distinct and independent network stack (e.g., TCP/IP). Consequently, management controller 152 may communicate with other devices independently of any of the in-band components (e.g., does not rely on any hosted software, hardware components, etc.). Accordingly, compromise of any of hardware resources 150 and hosted component may not result in indirect compromise of any management controller 152, and entities hosted by management controller 152.

To facilitate communication with other devices, data processing system 100 may include network module 160. Network module 160 may provide communication services for in-band components and out-of-band components (e.g., management controller 152) of data processing system 100. To do so, network module 160 may include traffic manager 162 and interfaces 164.

Traffic manager 162 may include functionality to (i) discriminate traffic directed to various network endpoints advertised by data processing system 100, and (ii) forward the traffic to/from the entities associated with the different network endpoints. For example, to facilitate communications with other devices, network module 160 may advertise different network endpoints (e.g., different media access control address/internet protocol addresses) for the in-band components and out-of-band components. Thus, other entities may address communications to these different network endpoints. When such communications are received by network module 160, traffic manager 162 may discriminate and direct the communications accordingly (e.g., over channel 170 or channel 172, in the example shown in FIG. 1B, it will be appreciated that network module 160 may discriminate traffic directed to any number of data units and direct it accordingly over any number of channels).

Accordingly, traffic directed to management controller 152 may never flow through any of the in-band components. Likewise, outbound traffic from the out-of-band component may never flow through the in-band components.

To support inbound and outbound traffic, network module 160 may include any number of interfaces 164. Interfaces 164 may be implemented using any number and type of communication devices which may each provide wired and/or wireless communication functionality. For example, interfaces 164 may include a wide area network card, a WiFi card, a wireless local area network card, a wired local area network card, an optical communication card, and/or other types of communication components. These components may support any number of wired/wireless channels 176.

Thus, from the perspective of an external device, the in-band components and out-of-band components of data processing system 100 may appear to be two independent network entities, that may independently addressable, and otherwise unrelated to one another.

Network module 160 may utilize the instance of the TCP/IP stack to allow hardware resources 150 and/or management controller 152 to communicate with other devices via packet switched networks and/or other types of communication networks.

To facilitate management of data processing system 100 over time, hardware resources 150, management controller 152 and/or network module 160 may be positioned in separately controllable power domains. By being positioned in these separately controllable power domains, different subsets of these components may remain powered while other subsets are unpowered.

For example, management controller 152 and network module 160 may remain powered while hardware resources 150 is unpowered. Consequently, management controller 152 may remain able to communication with other devices even while hardware resources 150 are inactive. Similarly, management controller 152 may perform various actions while hardware resources 150 are not powered and/or are otherwise inoperable, unable to cooperatively perform various process, are compromised, and/or are unavailable for other reasons.

To implement the separate power domains, data processing system 100 may include a power source (e.g., 180) that separately supplies power to power rails (e.g., 184, 186) that power the respective power domains. Power from the power source (e.g., a power supply, battery, etc.) may be selectively provided to the separate power rails to selectively power the different power domains. A power manager (e.g., 182) may manage power from power source 180 that is supplied to the power rails (e.g., by providing instructions via side band channels 174). Management controller 152 may cooperate with power manager 182 to manage supply of power to these power domains. Management controller 152 may communicate with power manager 182 via side band channels 174 and/or via other means.

In FIG. 1B, an example implementation of separate power domains using power rails 184-186 is shown. The power rails may be implemented using, for example, bus bars or other types of transmission elements capable of distributing electrical power. While not shown, it will be appreciated that the power domains may include various power management components (e.g., fuses, switches, etc.) to facilitate selective distribution of power within the power domains.

When providing its functionality, management controller 152 may perform all, or a portion, of the methods and operations described in FIG. 2A.

While illustrated in FIG. 1B with a limited number of specific components, a system may include additional, fewer, and/or different components without departing from embodiments disclosed herein.

To further clarify embodiments disclosed herein, an interaction diagram in accordance with an embodiment is shown in FIG. 2A. The interaction diagram may illustrate examples of how data may be obtained and used within the systems of FIGS. 1A-1B.

In the interaction diagram, processes performed by and interactions between components of a system in accordance with an embodiment are shown. In the diagram, components of the system are illustrated using a first set of shapes (e.g., 152, 160, 162, etc.), located towards the top of each figure. Lines descend from these shapes. Processes performed by the components of the system are illustrated using a second set of shapes (e.g., 206, 210, etc.) superimposed over these lines.

Interactions (e.g., communication, data transmissions, etc.) between the components of the system are illustrated using a third set of shapes (e.g., 202, 204, etc.) that extend between the lines. The third set of shapes may include lines terminating in one or two arrows. Lines terminating in a single arrow may indicate that one-way interactions (e.g., data transmission from a first component to a second component) occur, while lines terminating in two arrows may indicate that multi-way interactions (e.g., data transmission between two components) occur.

Generally, the processes and interactions are temporally ordered in an example order, with time increasing from the top to the bottom of each page. For example, the interaction labeled as 202 may occur prior to the interaction labeled as 204. However, it will be appreciated that the processes and interactions may be performed in different orders, any may be omitted, and other processes or interactions may be performed without departing from embodiments disclosed herein.

The lines descending from the first set of shapes (e.g., other hardware components 164) are drawn in dashes to indicate, for example, that the corresponding components may not be (i) operable, (ii) powered on, (iii) present in the system, and/or (iv) not participating in operation of the system for other reasons.

The processes shown in FIG. 2A may be performed by any entity shown in the systems of FIGS. 1A-1B (e.g., a device similar to data processing system 100, a server similar to cloud server 102, a device similar to one of trusted sources 104, etc.) and/or another entity without departing from embodiments disclosed herein.

Turning to FIG. 2A, an interaction diagram in accordance with an embodiment is shown. The interaction diagram may illustrate processes and interactions that may occur during management of operations of a data processing system to generate auditory signals for a user of the data processing system.

To manage operations of the data processing system, at operation 202, a request may be provided to network module 160 by cloud server 102. For example, the request may be generated and provided to network module 160 via (i) transmission via a message, (ii) storing in a storage with subsequent retrieval by network module 160, (iii) via a publish-subscribe system where network module 160 subscribes to updates from cloud server 102 thereby causing a copy of the request to be propagated to network module 160, and/or via other processes. By providing the request to network module 160, network module 160 may receive a copy of the request for data processing system 100.

The request may include: (i) sound information for the data processing system, (ii) a payload including a message specifying instructions to execute a sound file and parameters in which the sound file is to be performed, (iii) an identity of the requesting entity (e.g., cloud server 102), and/or (iv) other information.

At interaction 204, the request may be provided to management controller 152 by network module 160. For example, the request may be provided to management controller 152 via (i) transmission via a message, (ii) storing in a storage with subsequent retrieval by management controller 152, (iii) via a publish-subscribe system where management controller 152 subscribes to updates from network module 160 thereby causing a copy of the request to be propagated to management controller 152, and/or via other processes. The request may be provided to management controller 152 via an out-of-band communication channel similar to channel 172 described in FIG. 1B. By providing the request to management controller 152, management controller 152 may receive a copy of the request for data processing system and perform parsing processes.

Once received, management controller 152 may use the request to perform parsing process 206 to verify the request is obtained from a trusted source and identify instructions for performance of an action set by a component of the hardware resources of the data processing system. During parsing process 206, the request may be subjected to any type of verification process to determine whether the request is obtained from a trusted source. For example, management controller 152 may perform a lookup process using the identity of the requesting entity (e.g., specified by the request) as a key to determine whether the identity of the requesting entity is one of the trusted sources with authentication to provide the request. If the request is not determined to be from a trusted source, management controller 152 may reject the request.

Based on the determination that the request is from a trusted source, management controller 152 may initiate processing of the request as part of the parsing process 206. During parsing process 206, management controller 152 may process the payload of the request to identify an action set to be performed and identify a sound system hosted by hardware resources (e.g., hardware resources 150) of the data processing system to perform the action set. For example, management controller 152 may extract a message from the payload specifying instructions to execute a sound file by data processing system 100 at a point in time, and use the instructions to identify a corresponding action set to perform.

At interaction 208, instructions may be provided to sound system 162 by management controller 152. For example, the instructions may be provided to sound system 162 via (i) transmission via a message, (ii) storing in a storage with subsequent retrieval by sound system 162, (iii) via a publish-subscribe system where sound system 162 subscribes to updates from management controller 152 thereby causing a copy of the instructions to be propagated to sound system 162, and/or via other processes.

The instructions may be provided by management controller 152 using a direct interface to the sound system hosted by hardware resources 150 of data processing system 100. The direct interface may include various communication components to provide different forms of transmitting the instructions to the sound system of the data processing system. The direct interface may, for example, be a communication bus through which information is transmitted to the sounds system, be a side band channel (e.g., point to point link) used to transmit data to the sound system, etc. For example, the instructions may be provided to sound system 162 via a side band communication channel (e.g., side band channel 212) similar to side band channels 174 described in FIG. 1B. By providing the instructions to sound system 162, sound system 162 may receive a copy of the instructions.

Following interaction 208, sound system 162 may perform action set performance process 210. During action set performance process 210, sound system 162 may perform the action set (e.g., specified by the instructions received from management controller via side band channel 212) for data processing system 100 in order to generate an auditory signal by the data processing system. The action set may include: (i) initiating performance of a sound alert (e.g., by sound system 162) in order to notify a user of a scheduled event, (ii) initiating performance of a sound file in order to allow a user to utilize the sound system (e.g., 162) of the data processing system, and/or (iii) other actions.

Thus, as shown in the example of FIG. 2A, operations of a data processing system, for example, auditory signals may be managed using out-of-band methods. For example, requests for performance of sound files for the data processing system may be verified, processed, and/or managed using out-of-band components (e.g., management controller and using out-of-band communication channels). By using out-of-band components, auditory signals may be performed by a sound system of the data processing system in the event in-band components (e.g., hardware resources 150) are not operational and/or nonfunctional (e.g., powered off, lack of network connection, etc.).

Any of the processes illustrated using the second set of shapes and interactions illustrated using the third set of shapes may be performed, in part or whole, by digital processors (e.g., central processors, processor cores, etc.) that execute corresponding instructions (e.g., computer code/software). Execution of the instructions may cause the digital processors to initiate performance of the processes. Any portions of the processes may be performed by the digital processors and/or other devices. For example, executing the instructions may cause the digital processors to perform actions that directly contribute to performance of the processes, and/or indirectly contribute to performance of the processes by causing (e.g., initiating) other hardware components to perform actions that directly contribute to the performance of the processes.

Any of the processes illustrated using the second set of shapes and interactions illustrated using the third set of shapes may be performed, in part or whole, by special purpose hardware components such as digital signal processors, application specific integrated circuits, programmable gate arrays, graphics processing units, data processing units, and/or other types of hardware components. These special purpose hardware components may include circuitry and/or semiconductor devices adapted to perform the processes. For example, any of the special purpose hardware components may be implemented using complementary metal-oxide semiconductor based devices (e.g., computer chips).

Any of the processes and interactions may be implemented using any type and number of data structures. The data structures may be implemented using, for example, tables, lists, linked lists, unstructured data, data bases, and/or other types of data structures. Additionally, while described as including particular information, it will be appreciated that any of the data structures may include additional, less, and/or different information from that described above. The informational content of any of the data structures may be divided across any number of data structures, may be integrated with other types of information, and/or may be stored in any location.

As discussed above, the components of FIGS. 1A-2A may perform various methods to generate auditory signals by data processing systems using out-of-band methods. By using out-of-band methods (e.g., out-of-band components and/or out-of-band communication channels) to obtain and manage requests for performance of sounds to alert users of data processing systems, the data processing systems may be more likely to provide secure and reliable computer-implemented services.

Figure 2B:
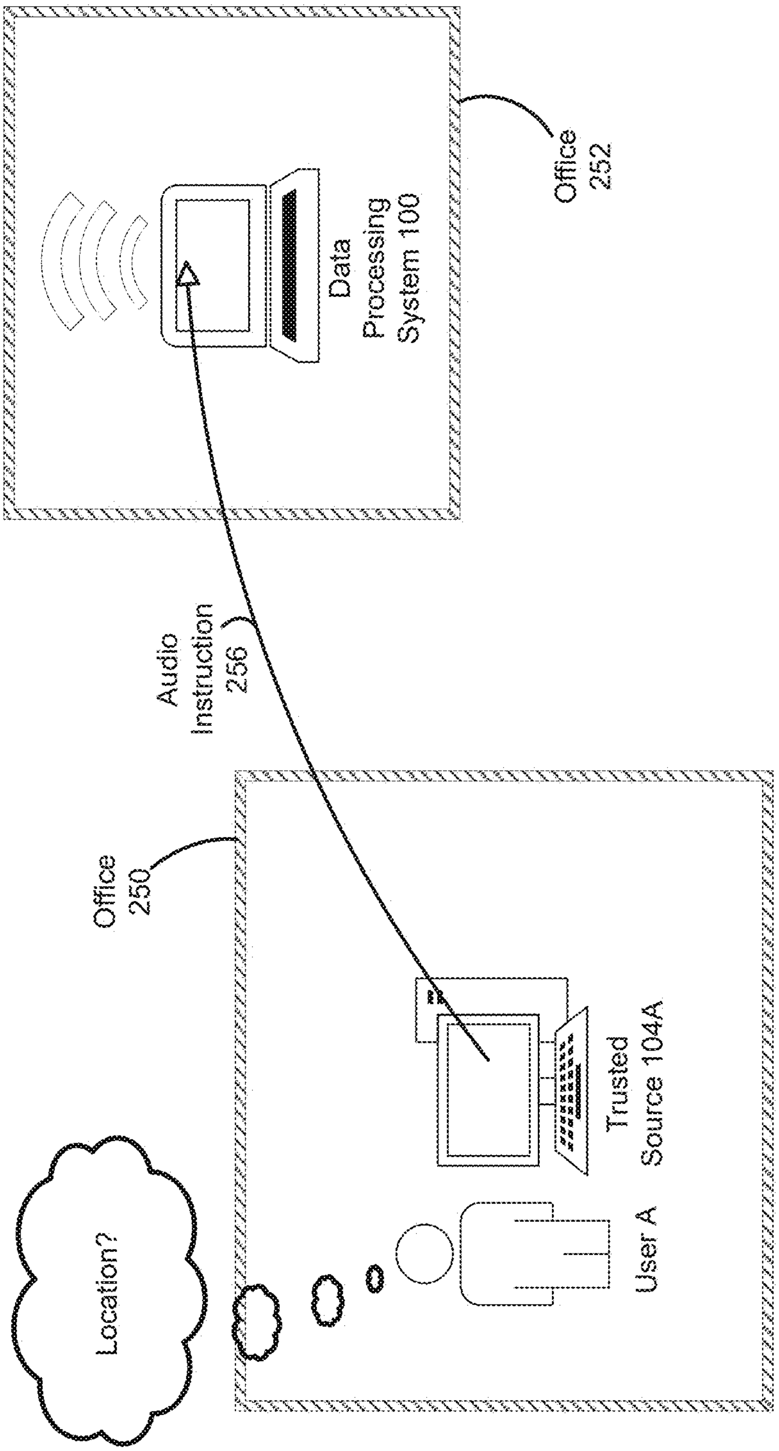
FIGS. 2B-2D show example diagrams illustrating implementation of auditory signaling using out-of-band components in accordance with an embodiment.
Figure 2C:
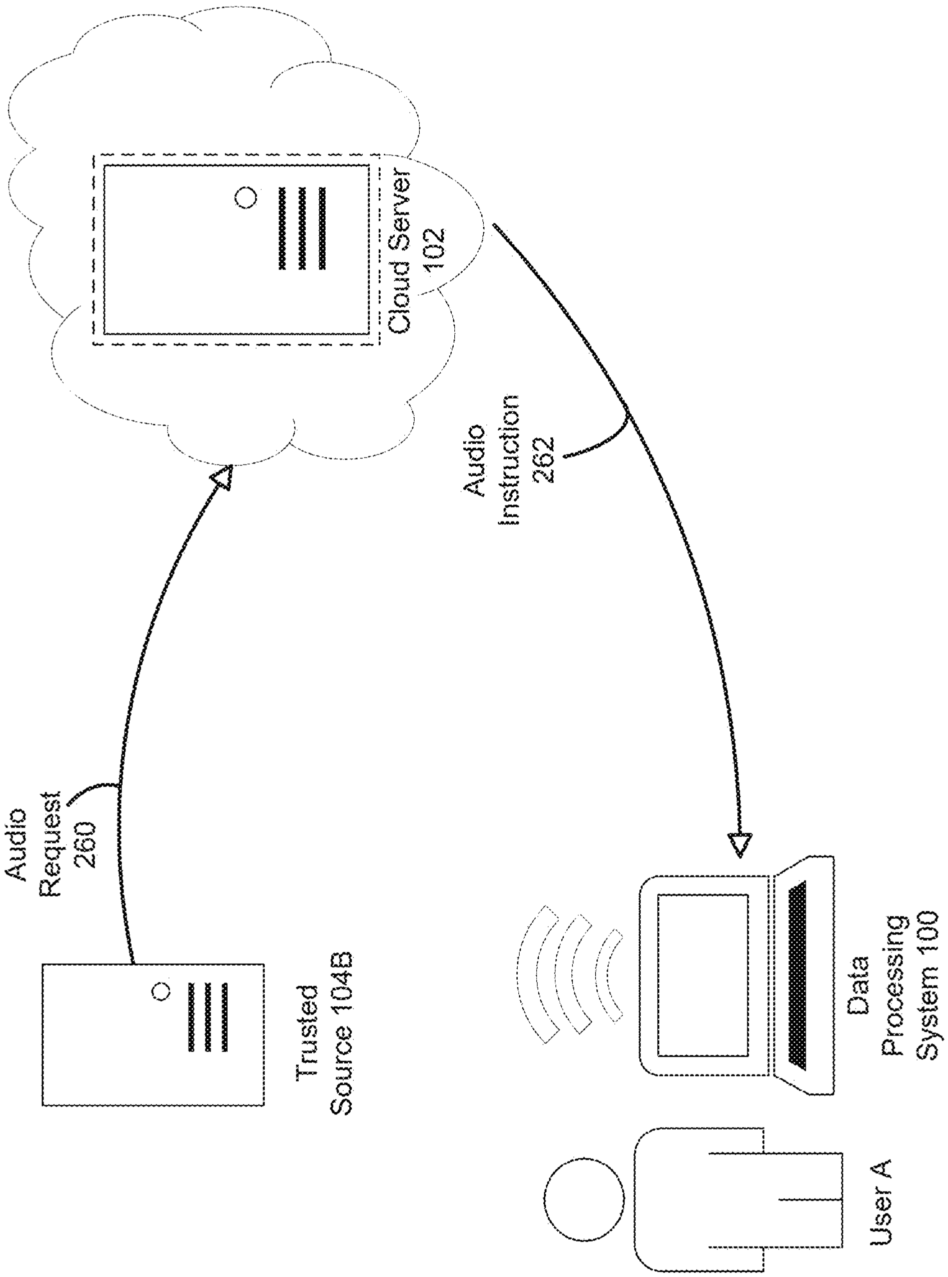
Figure 2D:
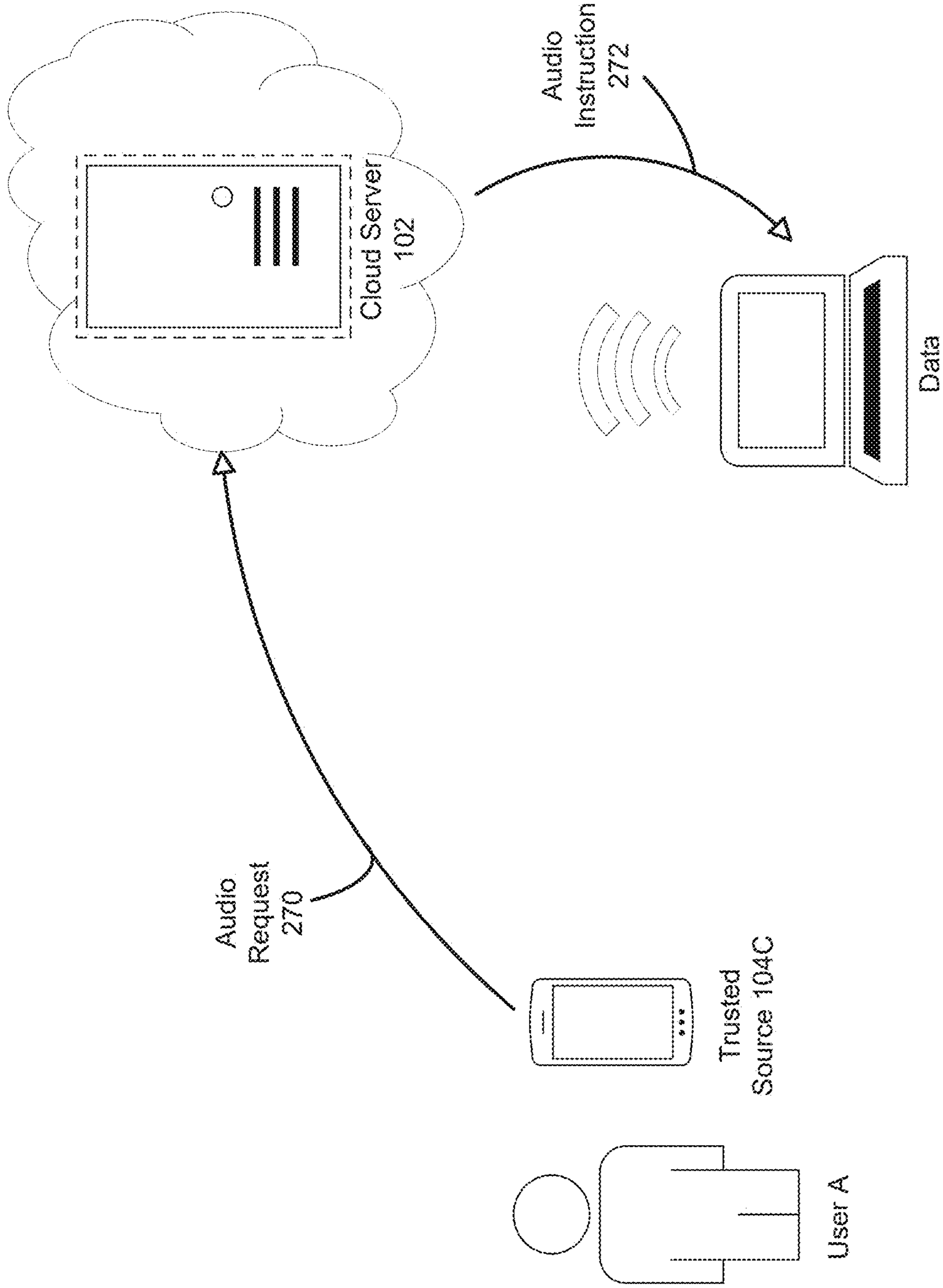

To further clarify embodiments disclosed herein, data flow diagrams in accordance with an embodiment are shown in FIGS. 2B-2D. In these diagrams, flows of data and processing of data are illustrated using different sets of shapes. A first set of shapes (e.g., 222, 224, etc.) is used to represent data structures and a second set of shapes (e.g., 220, 226, etc.) is used to represent processes performed using and/or that generate data.

To further clarify embodiments disclosed herein, examples implementations in accordance with an embodiment are shown in FIGS. 2B-2D. These figures show diagrams illustrating a management process that may utilize out-of-band methods to provide computer-implemented services by generating auditory signals. FIGS. 2B-2D may show diagrams of example of processes for managing requests specifying sound information to be performed by data processing systems in accordance with an embodiment. While described with respect to auditory management services, it will be understood that embodiments disclosed herein are broadly applied to different use cases as well as different types of data processing systems than those described below.

Turning to FIG. 2B, consider a first example scenario in which a location of a data processing system (e.g., personal computing device) is unknown to a user of the data processing system. The data processing system (e.g., hardware components and/or software resources of the data processing system) may not be functional (e.g., powered off, not connected to a network, etc.) and thus, may not be located using in-band components of the data processing system.

As shown in FIG. 2B, a user (e.g., user A) may be an owner and/or administrator of data processing system 100 and as such, operation of and/or the computer-implemented services provided by data processing system 100 may be desired by user A. User A may require knowledge of the location of data processing system 100 in order to operate data processing system 100 and therefore, provide the desired computer-implemented services. For example, user A may have left his laptop (e.g., data processing system 100) in a co-worker's office (e.g., office 252) and user A may be unable to remember the location of data processing system 100 (e.g., physically located in office 252). Office 252 and office 250, indicated by horizontal lines forming a square shape, may represent individual rooms physically separated from one another and may be utilized as office space for user A and/or other users (e.g., co-workers of user A).

To identify the location of data processing system 100, a user may provide a request to data processing system 100 to initiate performance of sounds by a sound system of the data processing system in order to alert the user of the location of the data processing system. For example, user A may operate trusted source 104A (e.g., located in office 250) to provide a request to data processing system 100 (e.g., located in office 252). The request may include audio instruction 256 to be performed by a sound system (e.g., one or more audio speakers) of data processing system 100 and may be provided to out-of-band components (such as a management controller via a network module as described in FIG. 2A) of data processing system 100.

Audio instruction 256 may include any type or quantity of information regarding sound data (e.g., sound file, identifier of a sound file, etc.) and/or any parameters (e.g., time and process guidelines) for performance of the sound data by the data processing system. For example, audio instruction 256 may include instructions for audio speakers (e.g., of data processing system 100) to play a sound file immediately upon receiving the request (e.g., by a management controller hosted by data processing system 100 as described in FIGS. 1A-2A).

Once audio instructions 256 are received by the management controller of data processing system 100, the management controller may verify the request (e.g., including audio instruction 256) is from a trusted source (e.g., similar to performing verification process described in FIG. 2A). The management controller may determine the request is from trusted source 104A (e.g., a trusted device by data processing system 100) and as such, the management controller may process audio instruction 256 to identify an action set to perform (e.g., perform a sound alert immediately) by the sound system (e.g., audio speakers) of data processing system 100.

Once the management controller identifies the action set to be performed by audio speakers of data processing system 100, the management controller may provide instructions (e.g., including the sound file to be played and time schedule for performance of the sound file) to the audio speakers (e.g., via a side band channel) in order to initiate performance of sounds (e.g., specified by the sound file) by data processing system 100. Thus, user A may use auditory signals to locate data processing system 100 in office 252.

Thus, as shown in the example of FIG. 2B, when the location of data processing systems is unknown, a user may utilize an external device to provide a request for sound notifications to be generated and performed by data processing system 100 (e.g., using sound system of the data processing system) using out-of-band methods. As such, the user may identify the location of the data processing system even if the in-band components (e.g., hardware resources and/or software components) are not functional.

Turning to FIG. 2C, now consider a second example scenario in which a remote entity (e.g., application server) may provide services for an application stored locally on data processing system 100. However, the in-band components (e.g., hardware components and/or software resources) of data processing system 100 may not be operational (e.g., powered off, without a network connection, etc.) and therefore, the application data stored locally (e.g., on a hard disk drive of the data processing system) may not be accessible to provide the desired computer-implemented services.

In order to provide the computer-implemented services (e.g., security management services), trusted source 104B (e.g., application servers for weather service provider for data processing system 100) may send a request (e.g., audio request 260) to cloud server 102. Audio request 260 may include information identifying the data processing system (e.g., 100), sound information for the data processing system, and/or any other information necessary to initiate performance of sounds to alert the user of data processing system 100 (e.g., user A) of a weather condition impacting the data processing system.

Once audio request 260 is received, cloud server 102 may utilize the information from audio request 260 to identify the data processing system in which the audio request is directed to and generate audio instruction (e.g., audio instruction 262) to provide to data processing system 100. Audio instruction 262 may include a message specifying instructions for performance of a sound file, identifier of the sound file, and/or parameters for performance of the sound file (e.g., time to initiate performance, duration of time to perform the sound file, etc.).

Once received, the management controller of data processing system 100 may utilize audio instruction 262 to identify the sound file in a sound file cache (e.g., via the identifier of the sound file) and the sound system to perform the sound file (e.g., audio speakers of the data processing system). The management controller may use a direct interface to provide the instructions for performing the sound file to the identified component of the sound system. For example, the direct interface (e.g., to the sound system of the data processing system) may include a communication bus through which information (e.g., the instructions) is transmitted to the audio speakers of data processing system 100.

Once obtained, the audio speakers of data processing system 100 may perform the sound file and therefore generate an auditory signal for a user of data processing system 100. Continuing the above example, the audio speakers may generate a sound alert that notifies user A of a weather alert (e.g., weather condition that may impact the safety of the user and/or data processing system).

Turning to FIG. 2D, consider a third example scenario in which a user (e.g., user A) may desire to stream music (e.g., an audio file) to a sound system (e.g., speakers) of a laptop (e.g., data processing system 100) from a personal computing device (e.g., trusted source 104C).

To do so, user A may utilize trusted source 104C to send audio request 270 to cloud server 102. Audio request 270 may include information identifying the data processing system (e.g., 100) in which the requested audio data is regarding, a sound file and parameters in which the sound file is to be performed, and/or any other information.

Once obtained, cloud server 102 may use information indicated by audio request 270 to identify data processing system 100 as the destination of the audio request and generate a message specifying instructions to initiate performance of the sound file (e.g., obtained from audio request 270) and/or including the sound file to perform.

Cloud server 102 may provide the instructions (e.g., audio instructions 272) for performing the sound file to data processing system 100 via the out-of-band components of data processing system 100. For example, a management controller of data processing system may receive audio instructions 272 using an out-of-band communication channel (e.g., via a network module and using an out-of-band channel similar to channel 172 described in FIG. 1B).

Once received, the management controller may process audio instruction 272 to obtain a copy of the sound file and parameters in which the sound file is to be performed. The management controller may provide the sound file and instructions to perform the sound file to the audio speakers (e.g., sound system) of data processing system 100 via a direct interface (e.g., side band channel similar to side band channels 174). Thus, user A may listen to performance of a sound file (e.g., music, audio book, etc.) performed by speakers of the data processing system 100.

Thus, as illustrated in FIG. 2D, an audio file may be selected by a user (e.g., using a trusted source such as an authorized cellphone) and provided to an external system (e.g., cloud server 102) in order to be performed by sound system of another device (e.g., data processing system 100).

FIG. 3 illustrates a method that may be performed by the components of the system of FIGS. 1A-2D. In the diagram discussed below and shown in FIG. 3, any of the operations may be repeated, performed in different orders, and/or performed in parallel with or in a partially overlapping in a timely manner with other operations. The method described with respect to FIG. 3 may be performed by a data processing system, any component of a data processing system (e.g., a management controller, hardware resources, a network module), a server, a user device, and/or another device.

Turning to FIG. 3, a flow diagram illustrating a method of managing operation of a data processing system in accordance with an embodiment is shown. The method may be performed, for example, by a data processing system, a management system, a communication system, a management controller, hardware resources, and/or other components illustrated in FIGS. 1A-2D.

At operation 300, a request may be obtained. The request may specify sound information for a data processing system. The request may be obtained via an out-of-band channel using methods described with respect to FIGS. 1A-2A and/or by other out-of-band communication methods. For example, to avoid using any potentially unavailable hardware resources (e.g., in-band components) of the data processing system, the request may be obtained by a management controller of the data processing system and/or may be provided (e.g., transmitted) to the network module via the out-of-band channel. The request may be obtained by: (i) receiving the request from an external entity, (ii) reading the request from storage, and/or (iii) other methods.

At operation 302, a verification process may be performed using the request to determine whether the request is from a trusted source. The verification process may be performed by (i) obtaining an identity of requesting entity (e.g., specified by the request), (ii) performing a look up process using the identity of the requesting entity as a key to identify whether the requesting entity is at least one of the authorized entities in a database for the data processing system, and/or (iii) other methods.

At operation 304, a determination is made regarding whether the request is from a trusted source. The determination may be based on the requesting entity being one of the entities with authorization to provide the request. For example, data management system may determine the request is from a trusted source by identifying information for the requesting entity that confirms authentication of the requesting entity to be trusted.

If the request is not from a trusted source (e.g., the determination is "No" at operation 304), then the method may proceed to operation 306. At operation 306, the request may be rejected. The request may be rejected by (i) refusing performance of any action set specified by the request, (ii) generating a notification indicating rejection of the request to provide to the requesting entity, and/or (iii) other methods. The method may end following operation 306.

Returning to operation 304, if the request is determined to be from a trusted source (e.g., the determination is "Yes" at operation 304), then the method may proceed to operation 308. At operation 308, a payload of the request may be processed to identify an action set to be performed. Processing the payload of the request may include (i) identifying a message of the payload, the message specifying instructions to execute a sound file by the data processing system at a point in time, (ii) using the instructions to identify the action set to be performed, and/or (iii) other methods.

Identifying the message of the payload may be facilitated by (i) reading the payload and identifying an indicator of the message, (ii) reading the message to identify instructions for execution of a sound file by the data processing system, and/or (iii) other methods.

At operation 310, a sound system hosted by hardware resources of the data processing system may be identified. The sound system may perform the action set. The sound system may be identified by (i) using an identifier of the sound system included in the message of the request, (ii) using a database of hardware components of the data processing system to identify a sound system corresponding to an action set (e.g., specified by the request), and/or (iii) other methods.

At operation 312, instructions to perform the action set may be provided in order to provide computer-implemented services by generating an auditory signal. The instructions may be provided by the management controller and using a direct interface to the sound system.

The method may end following operation 312.

Using the methods illustrated in FIG. 3, embodiments disclosed herein may provide systems and methods usable to manage data processing systems by obtaining audio requests (e.g., including sound information for the data processing system) from an external device by a management controller (e.g., via out-of-band communication methods) to verify the audio request and initiate performance of sounds by an identified sound system of the data processing system (based on verification that the audio request is from trusted source). By managing the audio requests without relying on in-band communication methods, the likelihood of performing authorized requests to perform sound alerts for users of the data processing system may be increased. By performing authorized requests for the data processing systems, computer-implemented services provided by the data processing systems may be more likely to be desirable.

Figure 4:
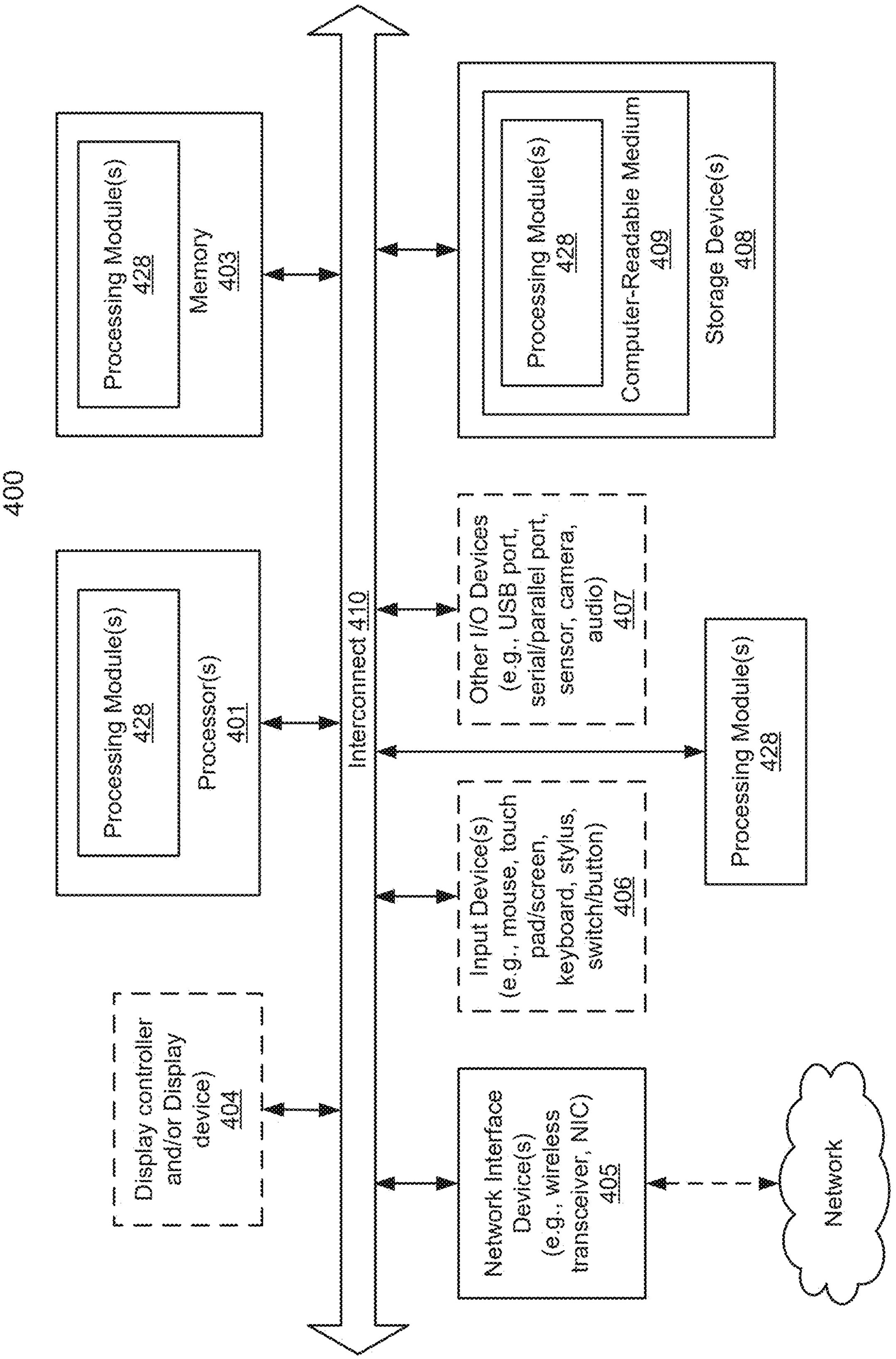
FIG. 4 shows a block diagram illustrating a data processing system in accordance with an embodiment.

Any of the components illustrated in FIGS. 1A-2D may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing operation of a data processing system, the method comprising:

obtaining, by a management controller that is internal to the data processing system and via an out-of-band communication channel, a request, the request specifying sound information for the data processing system, wherein the request is provided to the management controller by a network module of the data processing system via the out-of-band communication channel;

performing a verification process using the request to determine whether the request is from a trusted source; and in an instance of performing the verification process where the request is determined to be from the trusted source:

processing, by the management controller, a payload of the request to identify an action set to be performed;

identifying, by the management controller, a sound system hosted by hardware resources of the data processing system to perform the action set; and providing, by the management controller and using a direct interface to the sound system, instructions to perform the action set in order to provide computer-implemented services by generating an auditory signal, wherein the network module is adapted to separately advertise network endpoints for the management controller and hardware resources of the data processing system, the network endpoints being usable by a server to address communications to the hardware resources using an in-band communication channel and the management controller using the out-of-band communication channel.

2. The method of claim 1, wherein the action set specifies an identifier of a sound file and parameters in which the sound file is to be performed.

3. The method of claim 2, wherein the management controller caches a copy of the sound file in a sound file cache.

4. The method of claim 3, wherein the sound file cache comprises sound files that are used by remote entities to initiate performance of sounds to alert users of the data processing system to conditions impacting the data processing system.

5. The method of claim 4, wherein the conditions impacting the data processing system comprises at least one condition from a list of conditions consisting of:

a location of the data processing system being unknown to the users of the data processing system;

security of the data processing system being compromised; and safety of the users of the data processing system being compromised.

6. The method of claim 1, wherein the direct interface is a side band channel used to transmit data from the management controller to the sound system, the side band channel being a point to point link.

7. The method of claim 1, wherein the direct interface is a communication bus through which information is transmitted to at least one component comprising the sound system.

8. The method of claim 1, wherein processing the payload comprises:

identifying a message of the payload, the message specifying instructions to execute a sound file by the data processing system at a point in time; and using the instructions to identify the action set to be performed.

9. The method of claim 1, wherein the action set comprises:

obtaining, by the management controller and using the out-of-band communication channel, first location data for the data processing system;

obtaining, by the management controller and using the out-of-band communication channel, second location data for the trusted source;

performing, by the management controller, a comparison process using the first location data and the second location data to determine whether a difference between the first location data and the second location data falls within a proximity threshold; and in a first instance of the comparison process where it is determined that the difference between the first location data and the second location data falls within the proximity threshold: initiating performance of a sound alert by the identified sound system in order to allow a user to locate the data processing system.

10. The method of claim 1, wherein the action set comprises:

initiating performance of a sound alert by the identified sound system in order to notify a user of a scheduled event, wherein the sound alert is based on pre-configured settings corresponding to a user's calendar indicating upcoming events.

11. The method of claim 1, wherein the action set comprises:

initiating performance of a sound file by the identified sound system in order to allow a user to utilize the sound system of the data processing system, wherein the sound file is selected by the user using the trusted source and provided to the management controller via a remote cloud server and using the out-of-band communication channel.

12. The method of claim 1, wherein the management controller and the network module are on separate power domains from the hardware resources so that the management controller and the network module are operable while the hardware resources are inoperable.

13. The method of claim 1, wherein the out-of-band communication channel runs through the network module, the in-band communication channel that services the hardware resources also runs through the network module, and the network module is configured such that first communications meant for the hardware resources use the in-band communication channel and never flow through the management controller and second communications meant for the management controller use the out-of-band communication channel and never flow through the hardware resources.

14. The method of claim 1, wherein the network module hosts a transmission control protocol/internet protocol (TCP/IP) stack to facilitate network communications via the out-of-band communication channel.

15. A non-transitory machine-readable medium having instructions stored therein, which when executed by a management controller of a data processing system, cause the processor management controller to perform operations for managing operation of the data processing system, the operations comprising:

obtaining, by the management controller that is internal to the data processing system and via an out-of-band communication channel, a request, the request specifying sound information for the data processing system, wherein the request is provided to the management controller by a network module of the data processing system via the out-of-band communication channel;

performing a verification process using the request to determine whether the request is from a trusted source; and in an instance of performing the verification process where the request is determined to be from the trusted source:

processing, by the management controller, a payload of the request to identify an action set to be performed;

identifying, by the management controller, a sound system hosted by hardware resources of the data processing system to perform the action set; and providing, by the management controller and using a direct interface to the sound system, instructions to perform the action set in order to provide computer-implemented services by generating an auditory signal, wherein the network module is adapted to separately advertise network endpoints for the management controller and hardware resources of the data processing system, the network endpoints being usable by a server to address communications to the hardware resources using an in-band communication channel and the management controller using the out-of-band communication channel.

16. The non-transitory machine-readable medium of claim 15, wherein the action set specifies an identifier of a sound file and parameters in which the sound file is to be performed.

17. A data processing system, comprising:

a management controller that is internal to the data processing system; and a memory coupled to the management controller to store instructions, which when executed by the management controller, cause the management controller to perform operations for managing operation of the data processing system, the operations comprising:

obtaining, by the management controller of the data processing system and via an out-of-band communication channel, a request, the request specifying sound information for the data processing system, wherein the request is provided to the management controller by a network module of the data processing system via the out-of-band communication channel;

performing a verification process using the request to determine whether the request is from a trusted source; and in an instance of performing the verification process where the request is determined to be from the trusted source:

processing, by the management controller, a payload of the request to identify an action set to be performed;

identifying, by the management controller, a sound system hosted by hardware resources of the data processing system to perform the action set; and providing, by the management controller and using a direct interface to the sound system, instructions to perform the action set in order to provide computer-implemented services by generating an auditory signal, wherein the network module is adapted to separately advertise network endpoints for the management controller and hardware resources of the data processing system, the network endpoints being usable by a server to address communications to the hardware resources using an in-band communication channel and the management controller using the out-of-band communication channel.

18. The data processing system of claim 17, wherein the action set specifies an identifier of a sound file and parameters in which the sound file is to be performed.

19. The data processing system of claim 18, wherein the management controller caches a copy of the sound file in a sound file cache.

20. The data processing system of claim 19, wherein the sound file cache comprises sound files that are used by remote entities to initiate performance of sounds to alert users of the data processing system to conditions impacting the data processing system.

* * * * *